(12) United States Patent
Pires

(10) Patent No.: US 11,773,986 B2
(45) Date of Patent: Oct. 3, 2023

(54) SELECTIVE CONNECTION OF ANNULAR REGIONS

(71) Applicant: Baker Hughes Energy Technology UK Limited, Bristol (GB)

(72) Inventor: Fabio DeSouza Pires, Tyne and Wear (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 0 days.

(21) Appl. No.: 17/757,744

(22) PCT Filed: Dec. 18, 2020

(86) PCT No.: PCT/GB2020/053294
§ 371 (c)(1),
(2) Date: Jun. 20, 2022

(87) PCT Pub. No.: WO2021/130472
PCT Pub. Date: Jul. 1, 2021

(65) Prior Publication Data
US 2023/0014708 A1    Jan. 19, 2023

(30) Foreign Application Priority Data

Dec. 24, 2019 (GB) .................................. 1919278

(51) Int. Cl.
*F16K 3/02* (2006.01)
*E21B 17/02* (2006.01)
(Continued)

(52) U.S. Cl.
CPC .......... *F16K 3/0254* (2013.01); *E21B 17/021* (2013.01); *F16K 3/262* (2013.01); *F16K 31/1223* (2013.01); *F16L 1/20* (2013.01)

(58) Field of Classification Search
CPC .... F16K 3/0254; F16K 3/262; F16K 31/1223; E21B 17/021; F16L 1/20
(Continued)

(56) References Cited

U.S. PATENT DOCUMENTS

| 4,345,854 | A | * | 8/1982 | Valantin | .................... | F16L 1/20 |
| | | | | | | 405/170 |
| 4,412,671 | A | | 11/1983 | Tiefenthaler | | |
| 5,865,566 | A | * | 2/1999 | Finn | ..................... | E21B 19/004 |
| | | | | | | 405/169 |

FOREIGN PATENT DOCUMENTS

| CN | 107524822 A | 12/2017 |
| FR | 2260048 A1 | 8/1975 |

* cited by examiner

*Primary Examiner* — John Bastianelli
(74) *Attorney, Agent, or Firm* — Hogan Lovells US LLP

(57) ABSTRACT

A method and apparatus for selective connection of a first fluid communication region to a further fluid communication region at a subsea location and a flexible pipe are disclosed. The apparatus comprises a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end; at least one slidable member comprising a slidable body locatable in the channel and comprising a slidable member fluid passage extending through or around the slidable body; and at least one biasing element locatable proximate to at least one of the open channel end or closed channel end, for biasing the slidable body towards the open channel end; wherein the slidable member is slidable along a longitudinal axis of the channel responsive to a local environmental pressure provided at the open channel end.

17 Claims, 8 Drawing Sheets

(51) Int. Cl.
    *F16K 3/26*         (2006.01)
    *F16K 31/122*    (2006.01)
    *F16L 1/20*        (2006.01)

(58) Field of Classification Search
    USPC .................................................. 251/326–329
    See application file for complete search history.

SELECTIVE CONNECTION OF ANNULAR REGIONS

The present invention relates to a method and apparatus for selective connection of a first fluid communication region and a further fluid communication region at a subsea location. In particular, but not exclusively, this invention relates to a valve which facilitates selective connection of a first fluid communication region in an end fitting and a further fluid communication region in a connection tube thereby facilitating selective fluidic connection of annular regions of the first and further segments of flexible pipe body.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

It is known that an inner fluid retaining layer of a flexible pipe, often referred to as a liner or barrier layer, and an outer fluid retaining layer, referred to as an outer sheath, define between them an annulus region in which various metal structures may be located. During operation of a flexible pipe the annulus requires venting. Such an operation must occur before a partial or full depressurisation of a bore in a flexible pipe. The annulus may therefore be connected to a number of fluid communication passageways which may include venting passageways to vent carbon dioxide or water vapour or other gasses that may build up in the flexible pipe body during operation. During normal operating procedures accumulation of fluid in the annulus is avoided by continually or repeatedly exhausting gas from the annulus to a surface vessel or platform where the vented fluid can be burned via a flare system. A continuous vent path between multiple segments of flexible pipe body is advantageous as it reduces the partial pressure in each segment of flexible pipe body however, providing a continuous vent path between multiple segments of flexible pipe body and end fittings is challenging. Without venting however, a pressure in the annulus region can increase over time. Eventually the accumulated pressure can exceed a bore pressure in normal operation causing rupture. Alternatively if a riser needs to be detached from a surface vessel or platform (for example in the case of adverse weather conditions) a depressurisation of the bore is intentionally implemented. This results in bore pressure potentially being less than accumulated annulus pressure which can cause rupture.

A further problem in providing a continuous vent path between multiple segments of flexible pipe is that if the annulus of a single segment of flexible pipe body becomes flooded the entire flexible pipe system will also flood through the continuous vent path. This is expensive to repair and can incur considerable further losses through downtime of the flexible pipe system/lack of oil or gas production.

It is also known that during use of a flexible pipe chemicals/compounds dissolved in fluid being transported by the flexible pipe can cause damage to components of the flexible pipe body layers. Alternatively/additionally compounds/chemicals such as carbonic acid can accumulate in areas of the flexible pipe body and over time these can cause problems.

It is an aim of certain embodiments of the present invention to at least partly mitigate one of more of the above-mentioned problems.

It is an aim of certain embodiments of the present invention to provide a continuous vent path between multiple segments of flexible pipe body/between flexible pipes arranged in an end-to-end configuration.

It is an aim of certain embodiments of the present invention to provide a continuous vent path including multiple flexible pipes wherein a single flexible pipe section can be isolated if flooded so that the whole flexible pipe system does not also flood.

It is an aim of certain embodiments of the present invention to provide a fluid communication pathway between annular regions of two or more segments of flexible pipe body via two or more end fittings and at least one connection tube.

It is an aim of certain embodiments of the present invention to selectively connect a first fluid communication region located in an end fitting of a flexible pipe and a further fluid communication region located externally to the end fitting.

It is an aim of certain embodiments of the present invention to provide a vent passage extending between and including annular regions of multiple segments of flexible pipe body.

It is an aim of certain embodiments of the present invention to reduce the partial pressure of an annulus of a segment of flexible pipe body, the partial pressure being at least partly due to the presence of gasses such as carbon dioxide, by fluidly connecting the annulus of the segment of flexible pipe body to the annulus of further segments of flexible pipe body.

It is an aim of certain embodiments of the present invention to provide a visual indicator that an annular region of a segment of flexible pipe body has flooded.

It is an aim of certain embodiments of the present invention to fluidly isolate an annular region of a first segment of flexible pipe body from an annular region of a further segment of flexible pipe body when the annular region of the first segment of flexible pipe body floods, the annular regions of the first segment of flexible pipe body and the further segment of flexible pipe being in fluid communication prior to flooding.

It is an aim of certain embodiments of the present invention to provide an isolation valve disposed to provide selective fluidic connection between a first fluid communication region in an end fitting and a further fluid communication region in a connection tube that is located externally to the end fitting.

It is an aim of certain embodiments of the present invention to provide an isolation valve to disconnect fluidic connection between a first fluid communication region in an end fitting and a further fluid communication region in a connection tube that is located externally to the end fitting when an annular region of a segment of flexible pipe body that terminates within the end fitting is flooded with seawater.

It is an aim of certain embodiments of the present invention to provide apparatus for selective connection of a first fluid communication region and a further fluid communication region when a local environmental pressure located outside of the apparatus overcomes a biasing force provided by a biasing element within the apparatus.

It is an aim of certain embodiments of the present invention to provide apparatus for fluidly disconnecting a first fluid communication region and a further fluid communication region when a fluid pressure within the apparatus is equal to or greater than a local environmental pressure located outside of the apparatus.

It is an aim of certain embodiments of the present invention to provide a method of selectively connecting a first fluid communication region to a further fluid communication region.

It is an aim of certain embodiments of the present invention to provide a flexible pipe that includes a segment of flexible pipe body, an end fitting and apparatus for selectively connecting a first fluid communication region to a further fluid communication region at a subsea location.

According to a first aspect of the present invention there is provided apparatus for selective connection of a first fluid communication region to a further fluid communication region at a subsea location, comprising:
a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end;
at least one slidable member comprising a slidable body locatable in the channel and comprising a slidable member fluid passage extending through or around the slidable body; and
at least one biasing element locatable proximate to at least one of the open channel end or closed channel end, for biasing the slidable body towards the open channel end; wherein
the slidable member is slidable along a longitudinal axis of the channel responsive to a local environmental pressure provided at the open channel end.

Aptly in a first mode of operation in which a first biasing force at a position where at least one biasing element is located, and at least partially provided by the at least one biasing element, is greater than a further biasing force provided by the local environmental pressure, the slidable member is urged towards the open channel end such that the primary passageway and the slidable member fluid passage are non-aligned and the body of the slidable member is disposed to disconnect fluid communication between the first fluid communication region and the further fluid communication region.

Aptly in a further mode of operation in which the further biasing force is greater than the first biasing force, the slidable member is locatable such that the slidable member fluid passage and the primary passageway are at least partially aligned and the first fluid communication region and the further fluid communication region are in fluid communication.

Aptly the valve body further comprises a flood passage connecting a portion of the primary passageway between the first port and the channel, and a portion of the channel between the closed channel end and the primary passageway.

Aptly a fluid in said a portion of the channel provides a fluid pressure, the fluid pressure providing a fluidic biasing force which contributes to the first biasing force and optionally the fluid pressure is substantially the same as the local environmental pressure to bias the slidable member in the first mode of operation.

Aptly an inner channel surface of the channel comprises an abutment seat that is optionally located within a portion of the inner channel surface between the primary passageway and the open channel end, and the body of the slidable member comprises an outwardly extended region locatable proximate to the open channel end, the outwardly extending region being wider than an inner surface of the abutment seat.

Aptly the at least one biasing element comprises at least one spring.

Aptly the slidable member and/or the inner surface of the channel comprises at least one sealing element.

Aptly at least the valve body comprises a corrosion resistant material and optionally the slidable member comprises a corrosion resistant material.

According to a second aspect of the present invention there is provided a flexible pipe, comprising:
a first segment of flexible pipe body;
a first end fitting secured to a respective end of the first segment of flexible pipe body; and
apparatus for selective connection of a first fluid communication region to a further fluid communication region at a subsea location, comprising: a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end; at least one slidable member comprising a slidable body locatable in the channel and comprising a slidable member fluid passage extending through or around the slidable body; and at least one biasing element locatable proximate to at least one of the open channel end or closed channel end, for biasing the slidable body towards the open channel end; wherein the slidable member is slidable along a longitudinal axis of the channel responsive to a local environmental pressure provided at the open channel end; wherein the valve body is a first valve body supported on the first end fitting such that the first port of the first valve body is connected to the first end fitting and is fluidly connected to an annulus of the first segment of flexible pipe body.

Aptly the further port of the first valve body is fluidly connected to at least one connection tube, the connection tube optionally being locatable externally to the first segment of flexible pipe body and the first end fitting.

Aptly the flexible pipe further comprises:

at least one further segment of flexible pipe body; and at least one further end fitting secured to a respective end of the further segment of flexible pipe body; and further apparatus for selective connection of a first fluid communication region to a further fluid communication region at a subsea location, comprising: a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end; at least one slidable member comprising a slidable body locatable in the channel and comprising a slidable member fluid passage extending through or around the slidable body; and at least one biasing element locatable proximate to at least one of the open channel end or closed channel end, for biasing the slidable body towards the open channel end; wherein the slidable member is slidable along a longitudinal axis of the channel responsive to a local environmental pressure provided at the open channel end; wherein a further valve body of the further apparatus is supported on the further end fitting such that the first port of the further valve body is fluidly connected to an annulus of the further segment of flexible pipe body.

Aptly the further end fitting is arranged adjacent to the first end fitting and the connection tube extends from the further port of the first valve body to the further port of the further valve body and provides fluid communication between the further port of the first valve body and the further port of the further valve body, the connection tube optionally being locatable externally from the first end fitting, the further end fitting, the first segment of flexible pipe body and the further segment of flexible pipe body.

Aptly the flexible pipe further comprises:

a still further end fitting secured to a remaining free end of the first segment of flexible pipe body; and still further apparatus for selective connection of a first fluid communication region to a further fluid communication region at a subsea location, comprising: a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end; at least one slidable member comprising a slidable body locatable in the channel and comprising a slidable member fluid passage extending through or around the slidable body; and at least one biasing element locatable proximate to at least one of the open channel end or closed channel end, for biasing the slidable body towards the open channel end; wherein the slidable member is slidable along a longitudinal axis of the channel responsive to a local environmental pressure provided at the open channel end; wherein a still further valve body of the still further apparatus supported on the still further end fitting such that the first port of the still further valve body is fluidly connected to the annulus of the first segment of flexible pipe body.

Aptly at least one of the first end fitting, the further end fitting and/or the still further end fitting comprises at least one check valve.

According to a third aspect of the present invention there is provided a method of selectively connecting a first fluid communication region to a further fluid communication region at a subsea location, comprising:

biasing a slidable member including a slidable body located, and axially slidable, in a channel within a valve body towards an open channel end of the channel via at least one biasing element disposed at a closed channel end of the channel whereby a slidable member fluid passage extending across the body of the slidable member is non-aligned with a primary passageway extending through the valve body and intersecting the channel, the primary passageway extending from a first port of the valve body connected to a first fluid communication region to a further port of the valve body connected to a further fluid communication region, the slidable body being biased to disconnect fluid communication between the first fluid communication region and the further fluid communication region;

providing a local environmental pressure proximate to the open channel end; and when the local environmental pressure increases beyond a threshold pressure, urging the slidable member towards the closed channel end whereby the slidable member fluid passage and the primary passageway are at least partially aligned thereby fluidly connecting the first fluid communication region and the further fluid communication region.

Aptly the method further comprises providing a fluidic pressure within a portion of the channel between the closed channel end and the primary passageway, said portion of the channel being connected to a portion of the primary passageway between the first port and the channel via a flood passage wherein the fluidic pressure is provided by a fluid.

Aptly the method further comprises when the fluidic pressure is greater or less than a predetermined threshold, via the fluidic pressure together with the biasing element, urging the slidable member towards the open channel end thereby disconnecting fluid communication between the first fluid communication region and the further fluid communication region.

Aptly the fluidic pressure and the local environmental pressure are substantially the same and optionally are provided by seawater.

Aptly the method further comprises limiting a maximum displacement of the slidable member towards the closed channel end via an abutment seat on an inner surface of the channel which abuts against an outwardly extended region of the slidable member, said maximum displacement of the slidable member providing at least partial alignment of the through passage and the primary passageway.

Aptly the method further comprises at least partially sealing the valve body from the external environment via at least one sealing element on the slidable member and/or an inner surface of the channel.

Aptly the method further comprises limiting a maximum displacement of the slidable member towards the open channel end via an abutment collar, or cap, which limits the travel of the slidable member and prevents the slidable member from exiting the open channel end.

Certain embodiments of the present invention provide a continuous vent path between multiple sections of flexible pipe wherein, in the case of flooding, a flooded section of flexible pipe is isolated such that the whole flexible pipe system does not become flooded.

Certain embodiments of the present invention provide a visual indicator that an annular region of a segment of flexible pipe body has flooded.

Certain embodiments of the present invention provide a continuous vent path which reduces the partial pressure of each segment of flexible pipe body.

Certain embodiments of the present invention provide an apparatus for selective fluidic connection of annular regions of multiple segments of flexible pipe body.

Certain embodiments of the present invention provide a method of selectively connecting annular regions of multiple sections of flexible pipe that are arranged in a back-to-back configuration.

Certain embodiments of the present invention provide a flexible pipe comprising a segment of flexible pipe body, at least one end fitting and apparatus for selective connection of a first fluid communication region to a further fluid communication region that is supported on the end fitting and is fluidly connected to a segment of flexible pipe body that terminates within the end fitting.

Certain embodiments of the present invention provide isolation valves which are supported on end fittings and fluidly disconnect a flooded segment of flexible pipe from neighbouring segments of flexible pipe.

Certain embodiments of the present invention provide a connection tube which extents between neighbouring end fittings or valves supported on end fittings and provides a fluid communication passageway between the segments of flexible pipe.

Embodiments of the present invention will now be described hereinafter, by way of example only, with reference to the accompanying drawings in which.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe body and associated end fittings of the type which is manufactured according to API 17J. Such flexible pipe is often referred to as unbonded flexible pipe. Other embodiments are associated with other types of flexible pipe.

Figure 1:
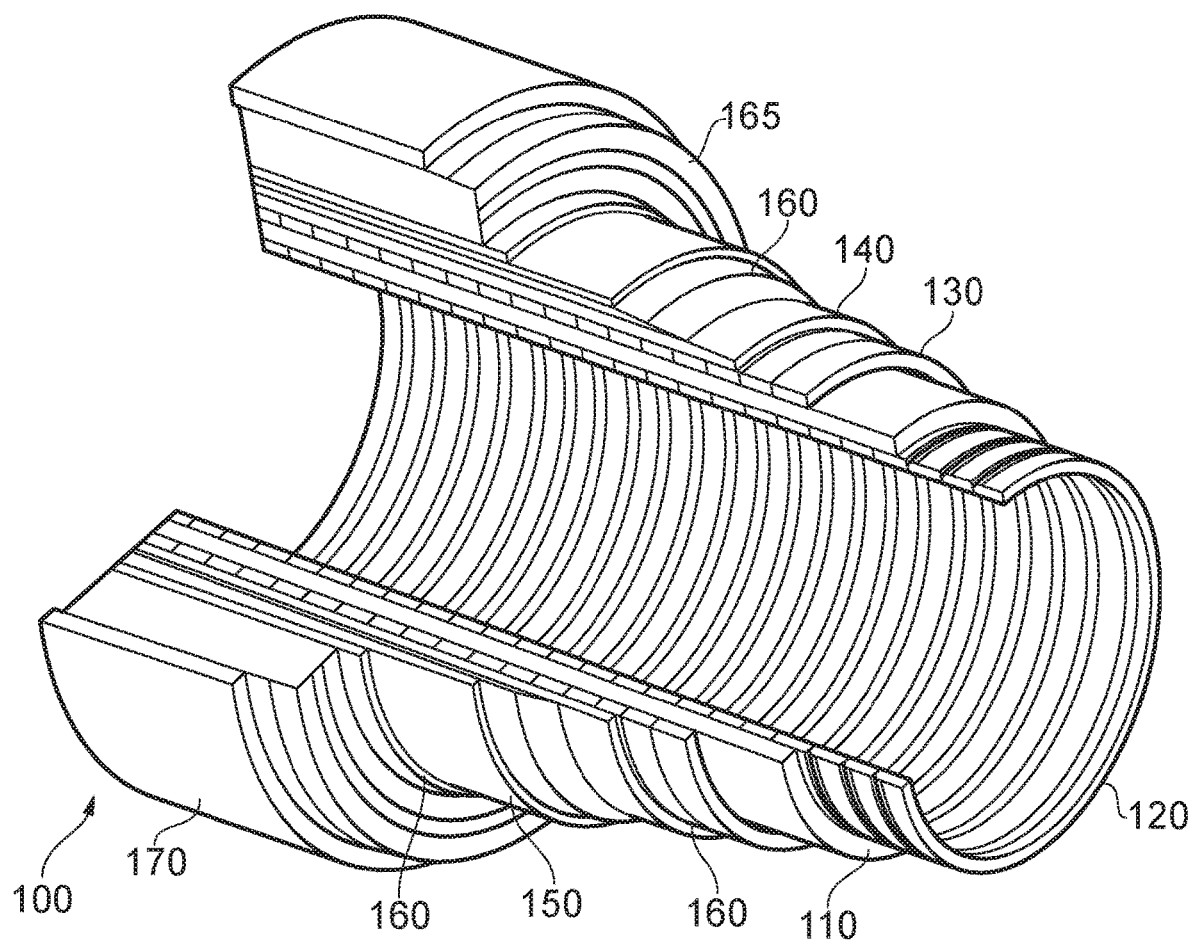
FIG. 1 illustrates flexible pipe body.

Turning to FIG. 1 it will be understood that the illustrated flexible pipe is an assembly of a portion of pipe body and one or more end fittings (not shown) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that the carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

The pipe body includes a pressure armour layer 130 that is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer is provided by an interlocked construction of wires with a lay angle close to 90°. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition. A pressure armour layer is positioned radially outside an underlying barrier layer.

The flexible pipe body also includes a first tensile armour layer 140 and second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is formed from a plurality of wires (to impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging". The flexible pipe body also includes optional layers of insulation 165 and an outer sheath 170, which comprises a polymer layer used to protect the pipe against penetration of seawater and other external environments, corrosion, abrasion and mechanical damage. Any thermal insulation layer helps limit heat loss through the pipe wall to the surrounding environment.

Each flexible pipe comprises at least one portion, referred to as a segment, of pipe body 100 together with an end fitting located at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
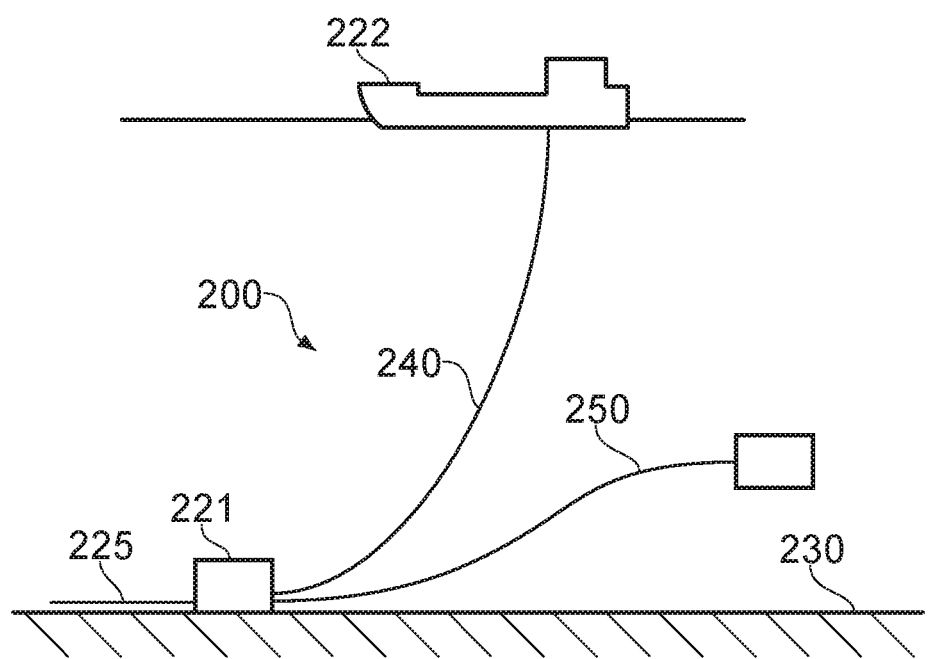
FIG. 2 illustrates certain uses of a flexible pipe.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. A riser, flowline or jumper can be formed by sections of flexible pipe (each including a segment of flexible pipe body and one or more end fittings) arranged length ways with end fittings of adjacent flexible pipes connected in a back-to-back configuration.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
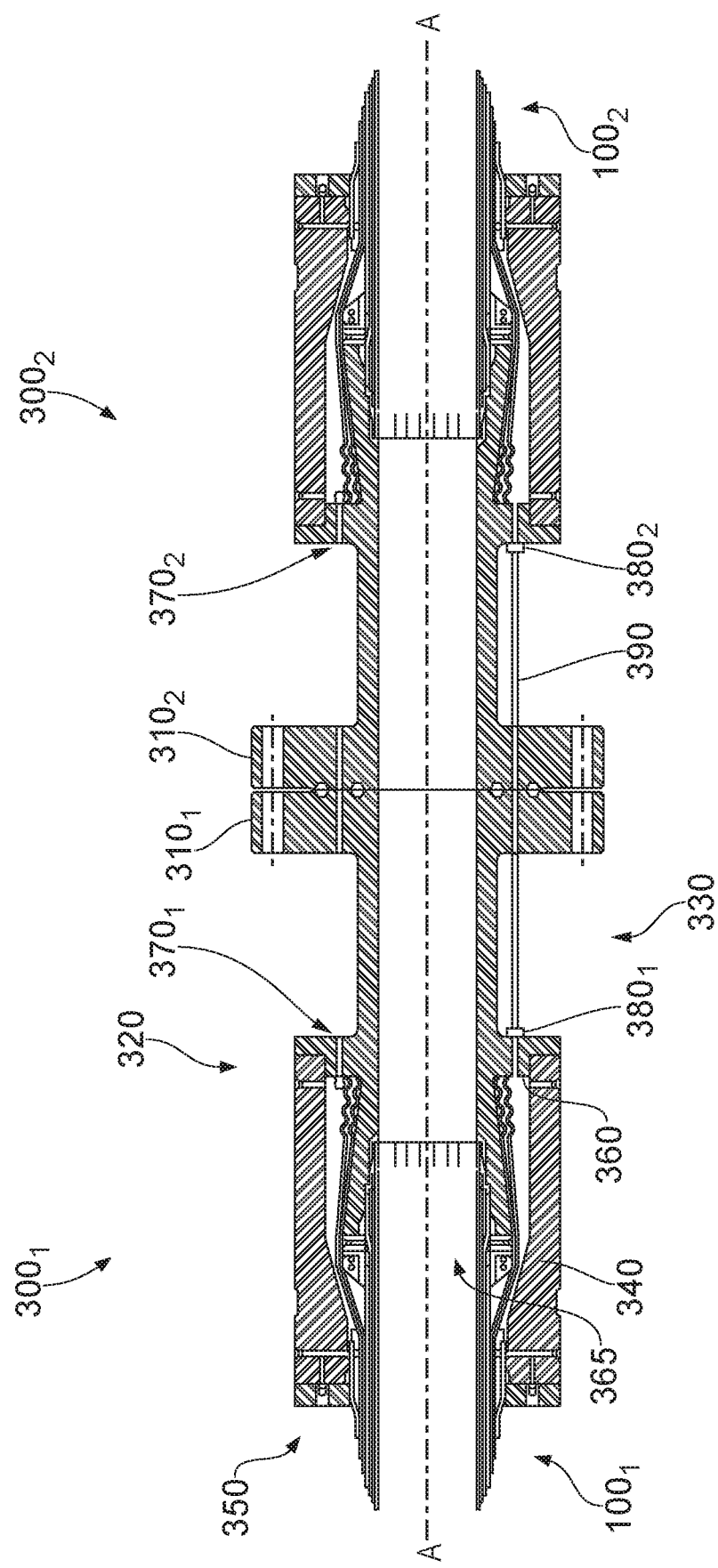
FIG. 3 illustrates end fittings arranged in a back-to-back configuration.

FIG. 3 illustrates a first (left-most in FIG. 3) end fitting $300_1$ and a further (right-most) end fitting $300_2$ arranged in a back-to-back arrangement. The first end fitting $300_1$ terminates a respective end of a first segment of flexible pipe body $100_1$ and the further end fitting $300_2$ terminates a respective end of a further segment of flexible pipe body $100_2$. It will be understood that a still further end fitting may terminate a remaining end of the first segment of flexible pipe body $100_1$ or a remaining end of the further segment of flexible pipe body $100_2$. The end fittings $300_1$, $300_2$ are connected together via respective connector flanges $310_1$, $310_2$. These are bolted together via bolts (not shown in FIG. 3) and have matching seal ring grooves on opposing flange faces.

Each end fitting 300 further includes a central flange 320 spaced apart from the connector flange 310 via a neck region 330. An outer jacket 340 is secured to the central flange and an outer collar 350 is secured to the jacket 340 and seals against an outer surface of an outer sheath 170 of the flexible pipe body 100 via at least one seal ring. A radially innermost surface of the jacket 340 is spaced apart from a radially outer surface of a generally cylindrical but slightly flared outwards end of an elongate end fitting body 360 of the end fitting. An open mouth 365 of the end fitting body faces associated the segment of flexible pipe body. Tensile armour wires are terminated in the tapered space between the outer casing and the end fitting body. Aptly epoxy is located in the tapered space to entomb the ends of the tensile armour wires. The end fitting 300 is associated with a central longitudinal axis A-A and the central longitudinal axis of each end fitting is aligned along a common line when the end fittings are arranged in a back-to-back configuration. During use production fluids are transported along a bore provided by the barrier layer or liner of the flexible pipe body and the inner surface of each end fitting 300.

The end fittings $300_1$, $300_2$ illustrated in FIG. 3 also each include a respective check valve $370_1$, $370_2$. A first isolation valve $380_1$ is supported on the first end fitting $300_1$ and a further isolation valve $380_2$ is supported on the further end fitting $300_2$ for venting gasses as will be described in detail herein below. Aptly a still further isolation valve may be supported on a still further end fitting. Aptly one or both of the end fittings $300_1$, $300_2$ may not include a check valve 370. Aptly only one of the end fittings $300_1$, $300_2$, may include an insolation valve 380. A connection tube 390 extending between the first and further isolation valves $380_1$, $380_2$ and through (or alternatively around) the connector flanges $310_1$, $310_2$ is also shown in FIG. 3 and provides a fluid communication passageway between the first and further end fittings $300_1$, $300_2$. Aptly the connector flanges 310 of each opposed end fitting flange each include a through-hole to permit the connection tube to extend through the connector flanges 310. The connection tube 390 shown in FIG. 3 is located externally to the end fittings $300_1$, $300_2$. Aptly the connection tube 390 may alternatively be located partly or wholly within one or both of the end fittings $300_1$, $300_2$. Aptly the connection tube 390 is comprised of a flexible polymeric material, with or without reinforcement in the form of fibres or wires. Aptly the connection tube 390 is comprised of a corrosion resistant material such as stainless steel. Aptly the connection tube 390 is comprised of any other suitable material.

Figure 4:
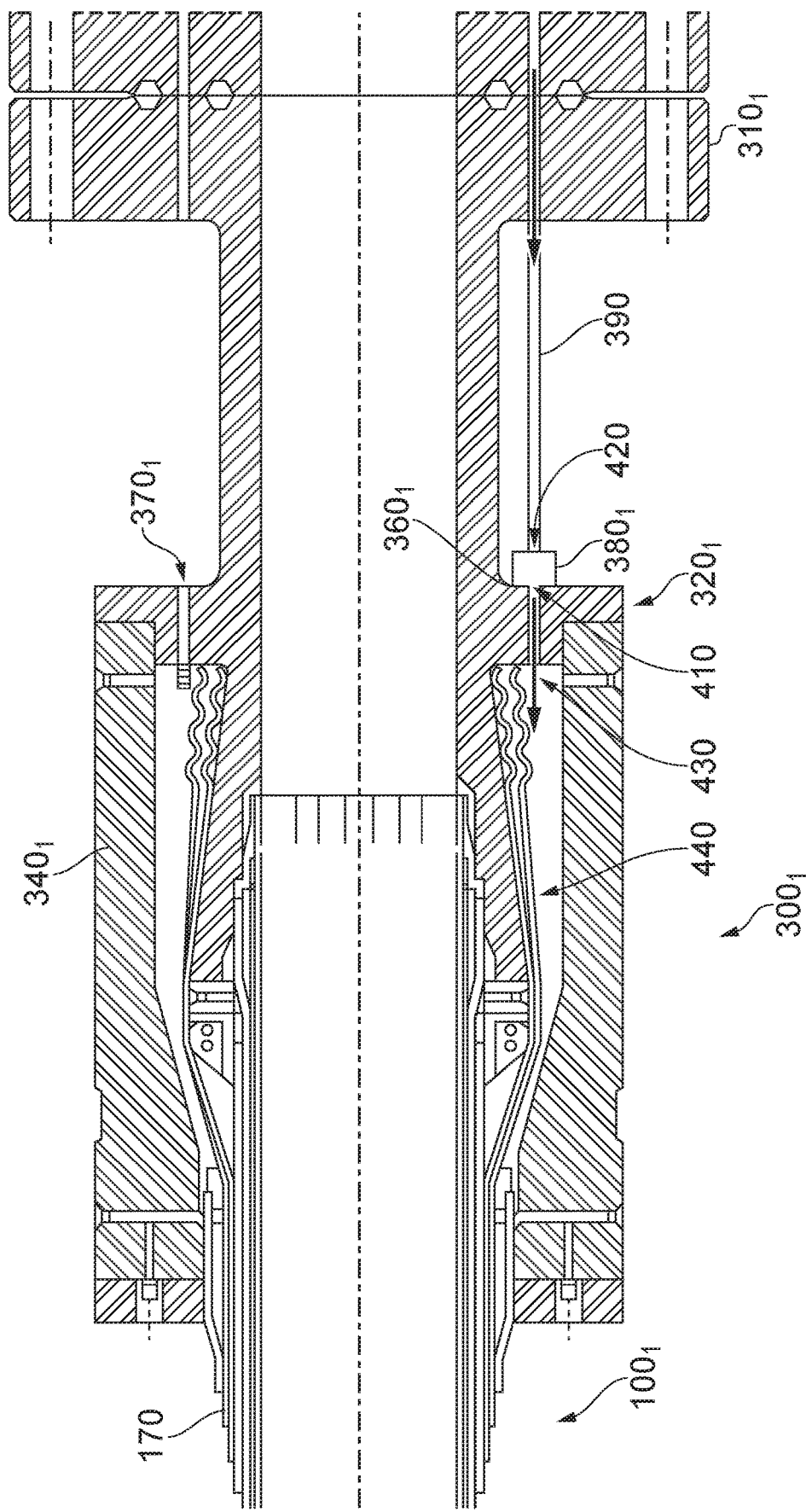
FIG. 4 illustrates an end fitting shown in FIG. 3 in more detail.

FIG. 4 illustrates the first (left-hand side most in FIG. 3) end fitting $300_1$ shown in FIG. 3 in more detail. FIG. 4 helps illustrate how the various separate layers of the flexible pipe body are terminated and where appropriate sealed. A pipe annulus is located between a radially outermost surface of a fluid retaining layer (a barrier layer is shown in FIG. 4) and a radially inner surface of an outer sheath 170. The annulus is in fluid communication with the isolation valve $380_1$ and the check valve $370_1$. FIG. 4 helps to illustrate how a vent path can be provided by providing a fluid communication passageway between the annulus of one flexible pipe and another. Notably as illustrated in FIG. 4 the connection tube 390 provides an elongate passageway that extends from the isolation valve $380_1$ in the first end fitting $300_1$ across a whole length of the neck region and through the connector flange $310_1$. As is illustrated in FIG. 3 the connection tube 390 additionally extends through the connector flange $310_2$, across the neck region and to the isolation valve $380_2$ of a neighbouring end fitting $300_2$. The connection tube 390 therefore fluidly connects the annulus of the first segment of flexible pipe body $100_1$ to the annulus of the further segment of flexible pipe body $100_2$ via the first and further end fittings $300_1$, $300_2$ and through associated isolation valves $380_1$, $380_2$. The connection tube 390 can thus be used as part of an overall venting path leading to a surface burn off point or midwater vent valve. The arrows in FIG. 4 illustrate an example of fluid flow through the illustrated part of the venting path. It will be understood that three separate connection tubes could instead be utilised in series, one connecting the end fitting body $360_1$ of the first end fitting $300_1$ to a through port of the connector flange $310_1$ of the first end fitting $300_1$, one connecting an end fitting body $360_2$ of the further end fitting $300_2$ to a through port of the connector flange $310_2$ of the further end fitting $300_2$ and one connecting the through port of the connector flange $310_1$ of the first end fitting $300_1$ to the through port of the connector flange $310_2$ of the further end fitting $300_2$.

An isolation valve 380 provides a selective fluidic connection between a respective end fitting 300 and a connection tube 390. The isolation valve is therefore apparatus for selective connection of a first fluid communication region 410 located within an end fitting 300 to a further fluid communication region 420 located within the connection tube 390. In the end fitting shown in FIG. 4, the first fluid communication region 410 is located within an opening/through port 430 disposed through the central flange 320 of the elongate end fitting body 360 which thus puts the opening/through port 420 in fluid communication with the region 440 between the outer casing and the open end of the elongate body. Although optionally filled with epoxy this space 440 is not fluid tight and is in fluid communication with the annulus region of the flexible pipe body 100. Optionally one or more tubes can be located within the epoxy area providing further portions of the vent passage between a lift off point where the tensile armour wires lift off from the underlying layer to a region close to the opening formed by the through bore/port 430 in the central flange. In this way a selectively connected fluid communication passageway can be provided through a whole length of the end fitting body between the annulus of the flexible pipe body and an end of the end fitting. An advantage of this methodology is that only longitudinally extending passageways need to be manufactured through the flanges. That is to say no radially outwardly extending passageway portions need be utilised. Of course such communication passageways could be utilised if it were preferred to connect the isolation valve 380 and connection tube 390 in some other manner. It will be understood that the isolation valves 380 may also be connected to further regions of the end fitting provided that the isolation valve remained in selective fluid communication with the annulus of the segment of flexible pipe body 100. For instance, instead of the through bore/port 430 passing through the central flange 320, it may alternatively pass through the jacket 340 and connect to the connection tube 390 at the outside diameter of the jacket via an isolation valve 380. Likewise also the isolation valve 380 may alternatively be positioned at the connector flange 310 end of the connector tube 390.

Figure 5:
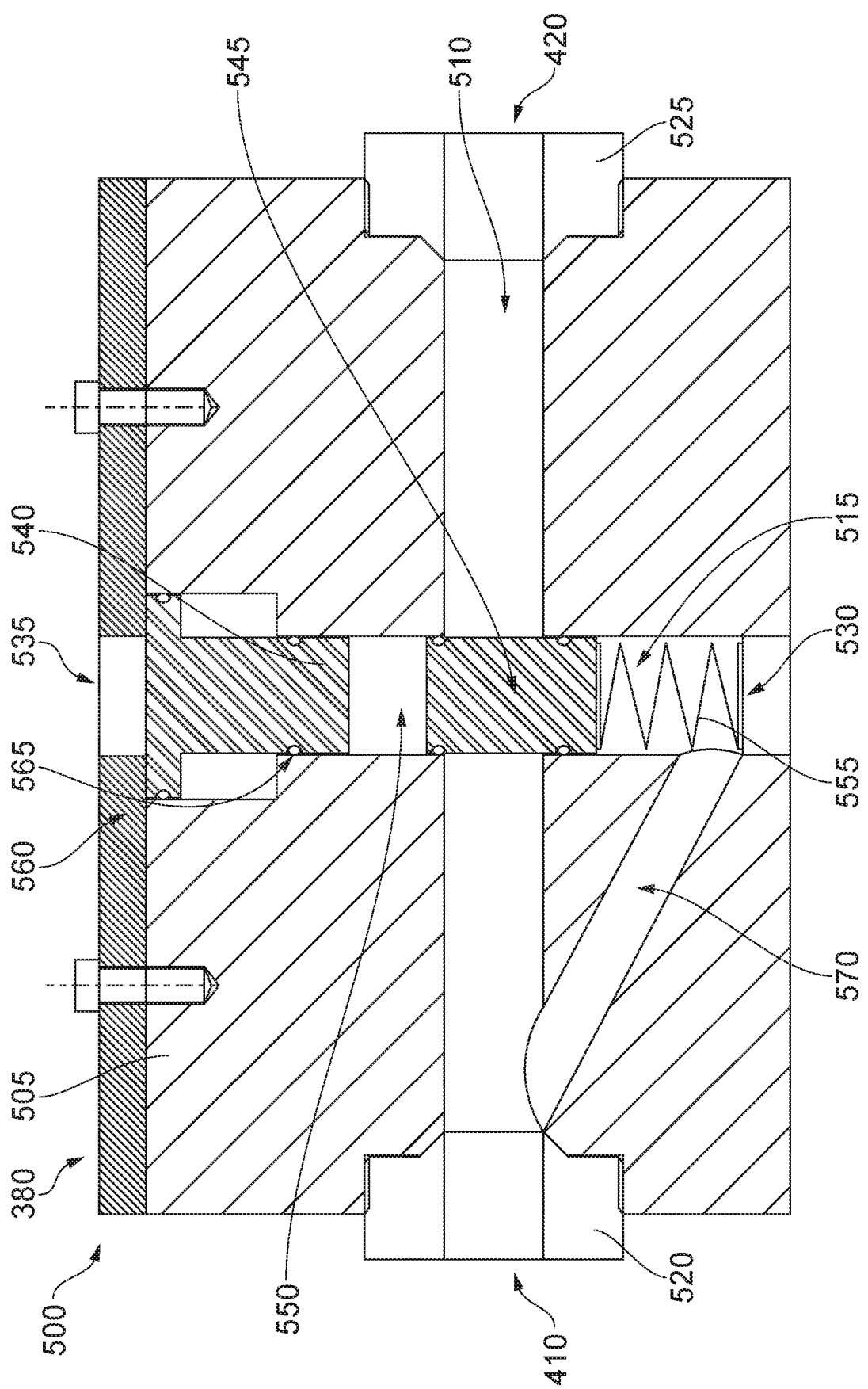
FIG. 5 illustrates an isolation valve in a first mode of operation.

FIG. 5 illustrates an isolation valve 380 in a first mode of operation 500 in which the first fluid communication region 410 and the further fluid communication region 420 are fluidly disconnected. The orientation of the isolation valve shown in FIG. 5 relates to the first (left most) isolation valve $380_1$ in the first end fitting illustrated in FIGS. 3 and 4. The isolation valve 380 comprises a valve body 505 which includes a primary passageway 510 and a channel 515. The primary passageway extends through the valve body 505 between a first port 520 of the valve body 505 and a further port 525 of the valve body 505. The first port 520 is connected to, proximate to or in fluid communication with the first fluid communication region 410 which is within a respective end fitting 300 as illustrated in FIG. 4. The further port 525 is connected to, proximate to, or in fluid communication with the further fluid communication region 420 which is within a respective connection tube 390 as illustrated in FIG. 4. Aptly the valve body 505 is comprised of a rigid material. Aptly the valve body is 505 is comprised of a metallic or alloy or ceramic or composite material. Aptly the valve body 505 is comprised of a corrosion resistant material. Aptly the valve body 505 is coated is a corrosion resistant coating. Aptly the valve body 505 is coated in any other suitable coating.

The channel 515 extends through the valve body 505 between a closed channel end 530 and an open channel end 535. The closed channel end 530 may or may not be spaced away from an outer surface of the valve body 505. The closed channel end 530 may or may not be proximate to an outer surface of the valve body 505. The channel 515 intersects with the primary passageway 510 such that a portion of the primary passageway 510 is also a portion of the channel 515 and a portion of the channel 515 is also a portion of the primary passageway 510. In the isolation valve 380 shown in FIG. 4, the channel 515 and the primary passageway 510 are disposed/oriented perpendicular to each other and intersect at a central part of the valve body 405. Aptly any other suitable intersecting configuration of the primary passageway 510 and the channel 515 could be utilised. A slidable member 540 is located in the channel 515 and comprises a slidable body 545 and a slidable member fluid passage 550 which extends through or around the slidable body 545. Aptly the slidable body 445 is comprised of a rigid material. Aptly the slidable body 445 is comprised of a metallic or alloy or polymer or composite material. Aptly the slidable body 445 is comprised of a corrosion resistant material. Aptly the slidable body 445 is comprised of any other suitable material. Aptly the slidable body 445 is coated in a corrosion resistant coating. Aptly the slidable body 445 is coated in any other suitable coating, for instance a coating suitable for inhibiting biofouling and/or marine growth. Aptly the slidable member 540 is predominantly cylindrical. Aptly the slidable member 540 is of any other suitable shape that compliments the shape of the channel 515. Aptly the slidable member 540 has a somewhat hourglass shape. Aptly the slidable member fluid passage 550 is a through hole disposed through the slidable body 545. Aptly the slidable member fluid passage 550 is a groove disposed on one or more sides of the slidable body 545. Aptly the slidable member 545 is configured to seal against the sides channel 515 in at least one location using a suitable seal 565 (for instance using elastomeric O-rings) sited within grooves within either the slidable body 545 or in the valve body 505.

A spring 555 is also located in the channel 515. The spring is an example of a biasing element. Aptly the spring 555 may be replaced by any other suitable biasing element. The spring 555 provides a first biasing force at a position of the spring 555 that urges the slidable member 540 towards the open channel end 535 when a further biasing force provided by an external environmental pressure proximate to the open channel end 535 is not sufficient to overcome the first biasing force. In the absence of fluid in the channel 515, the first biasing force is predominantly provided by the spring 555. If fluid is present in the channel (as will be described below), the spring 555 may only partially contribute to the first biasing force. Aptly a maximum displacement of the slidable member 540 towards the open channel end 535 is provided by an abutment collar or cap 560 which prevents the slidable member from exiting the open channel end 535. The biasing of the slidable member 540 towards the open channel end 535 axially non-aligns the primary passageway 510 and the slidable member fluid passage 550. The slidable body 545 of the slidable member 540 blocks the primary passageway and thereby prevents fluid communication between the first fluid communication region 410 and the further fluid communication region 420. The biasing of the slidable member 540 towards the open channel end 535 therefore defines the first mode of operation 500 of the isolation valve 380. In operation, the first mode of operation 500 therefore fluidly disconnects the annulus of a segment of flexible pipe body 100 from the connection tube 390 thereby disconnecting the annular regions of two segments of flexible pipe body $100_1$, $100_2$ which are adjoined via end fittings $300_1$, $300_2$ in a back-to-back configuration as illustrated in FIG. 3. Aptly the slidable member and/or an inner surface of the channel comprise at least one seal 565 disposed to fluidly seal the primary passageway 410, the slidable member fluid passage 550 and aptly the channel 515 from the external environment. Optionally a cover plate is secured to a top surface of the isolation valve as illustrated in FIG. 5 (and FIG. 6). It would be understood that some embodiments of the isolation valve would not utilise a cover plate.

Figure 6:
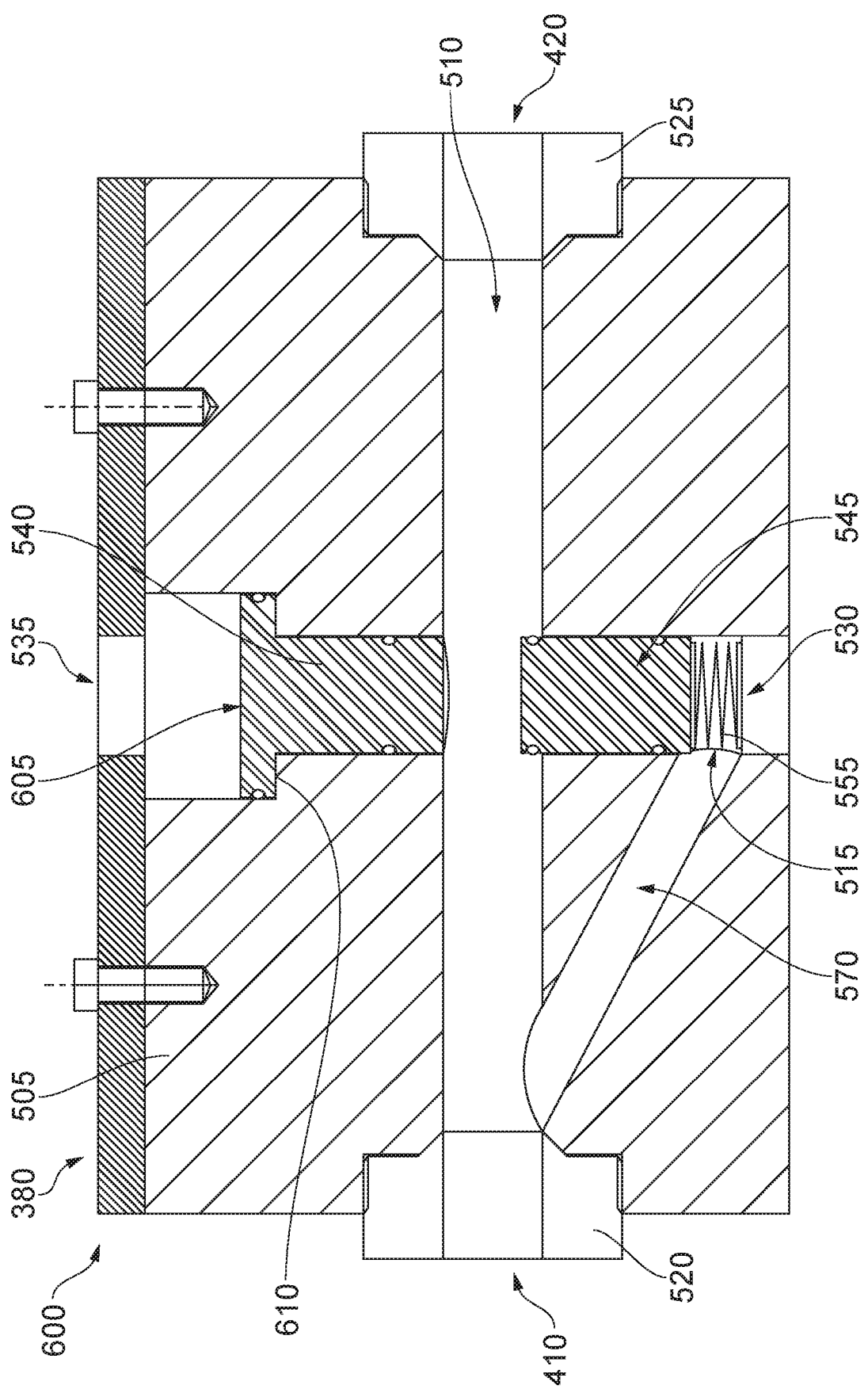
FIG. 6 illustrates the isolation valve shown in FIG. 5 in a further mode of operation.

FIG. 6 illustrates the isolation valve 380 illustrated in FIG. 5 in a further mode of operation 600 in which the first fluid communication region 410 and the further fluid communication 420 region are fluidly connected. In the further mode of operation 600 of the isolation valve 380, an external environmental pressure proximate to the open channel end 535 is sufficient to bias the slidable member 540 towards the closed channel end 530. The slidable body 545 of the slidable member 540 comprises an outwardly extending region 605 proximate to the open channel end and the channel comprises an abutment seat 610 on its inner surface. The abutment of the outwardly extending region 605 of the slidable member 540 on the abutment seat 610 provides a maximum displacement of the slidable member 540 towards the closed channel end 530. At this maximum displacement of the slidable member 540 towards the closed channel end 530, the slidable member fluid passage 550 and the primary passageway 510 are aligned to thereby permit fluid communication between the first fluid communication region 410 and the further fluid communication region 420. The biasing of the slidable member 540 towards the closed channel end 530 therefore defines a further mode of operation 600 of the isolation valve 380.

The spring 555 is manufactured/designed such that water pressure of an expected particular depth (which may be anywhere from sea level to thousands of meters underwater) is sufficient to bias the slidable member 540 to its maximum displacement towards the closed channel end 530 (to thereby bias the isolation valve 380 towards its further mode of operation 600). In operational use subsea the isolation valve 380 will therefore permit the passage of fluid between the first fluid communication region 410 and the further fluid communication region 420 and therefore between the end fitting 300 and the connection tube 390. In its further mode of operation 600, the isolation valve 380 therefore permits fluid communication between the annular regions of two segments of flexible pipe body $100_1$, $100_2$ which are adjoined via end fittings $300_1$, $300_2$ in a back-to-back configuration as illustrated in FIG. 3.

As can be seen in FIGS. 5 and 6, the valve body 505 additionally includes a flood passage 570 that connects a portion of the primary passageway 510 between the first port 520 and the channel 515 and a portion of the channel 515 between the primary passageway 510 and the closed channel end 530. The flood passage 570 in FIGS. 5 and 6 is illustrated as a linear passage angled with respect to the axis of the primary passageway 510. Other shapes of the passage such as dog leg or arcuate passages could be used. As the annular region of the segment of flexible pipe body is in fluid communication with the first port 520 of the isolation valve 380, a flooding of the annulus of the segment of flexible pipe body 100 with seawater, which may be due to a sealing failure within the segment of flexible pipe body 100 or an accidental breach in an outer sheath, will result in an ingress of seawater into the isolation valve 380 via the first port 520. As the connection tube 390 provides a fluid communication pathway between annular regions of two segments of flexible pipe body $100_1$, $100_2$ which are adjoined via end fittings $300_1$, $300_2$ in a back-to-back configuration as illustrated in FIG. 3, a flooding of any one annular region of a segment of flexible pipe body will result in a flooding of annular regions in further segments of flexible pipe body should the isolation valve 380 be confined in its further mode of operation 600 while in subsea use. The first possible mode of operation permits this.

The flood passage 570 is positioned on the side of the isolation valve most proximate to the first port 520 and therefore also most proximate to the end fitting 300. As previously discussed, the isolation valve in FIGS. 5 and 6 relates to the isolation valve $380_1$ supported on the first (left-most) end fitting $300_1$ in FIG. 3. It will be understood that the isolation valve $380_2$ supported on the further end fitting $300_2$ in FIG. 3 will be located on an opposing side of the valve body 505 as the valve is oriented such that first port 520 and the further port are reversed 525 due to the back-to-back configuration of the first and further end fittings $300_1$, $300_2$. An ingress of seawater into the isolation valve via the first port 520 results in seawater predominantly passing into the flood passage 570 and therefore into the portion of the channel 515 between the closed channel end 530 and the primary passageway 510 (beneath the slidable member as viewed in FIGS. 5 and 6) as opposed to passing through the slidable member fluid passage and towards the further port 525. A bottom surface of the slidable body may or may not start to occlude an opening of the flood passage in the second mode of operation.

When a substantial amount of seawater has entered the channel 515 through the flood passage 570, a fluid pressure will be imparted by that sea water on a surface of the slidable member 545 most proximate to the closed channel end 530. As both the fluid pressure and the local environmental pressure are provided by seawater of substantially the same depth, the fluid pressure and the local environmental pressure will be substantially the same. In this situation wherein seawater due to a flooded annular region of flexible pipe body 100 is present in the channel 515, the first biasing force is now provided by a combination of the fluid pressure and the spring 555. The first biasing force is therefore greater than the further biasing force due to the contribution of the spring 555 alone and the slidable member 540 is urged the open channel end 535. The isolation valve 380 thus transitions towards the first mode of operation 500 to thereby fluidly disconnect the first fluid communication region 410 and the further fluid communication region 420. The isolation valve 380 thus isolates the flooded segment of flexible pipe body 100 thereby preventing the ingress of seawater into, and the flooding of further segments of flexible pipe body such as neighbouring portions connected via end fittings in a back-to-back configuration as illustrated in FIG. 3. Aptly the isolation valve 380 provides a visual indicator that an annular region of a segment of flexible pipe body has flooded. For example this can be due to highly visible paint on the surface of the outwardly extending region 605 of the slidable member 540 closest to the open channel end 535, by alarm systems integrated in/connected to the isolation valve or by a light and/or sound source configured to trigger responsive to the isolation valve.

Figure 7:
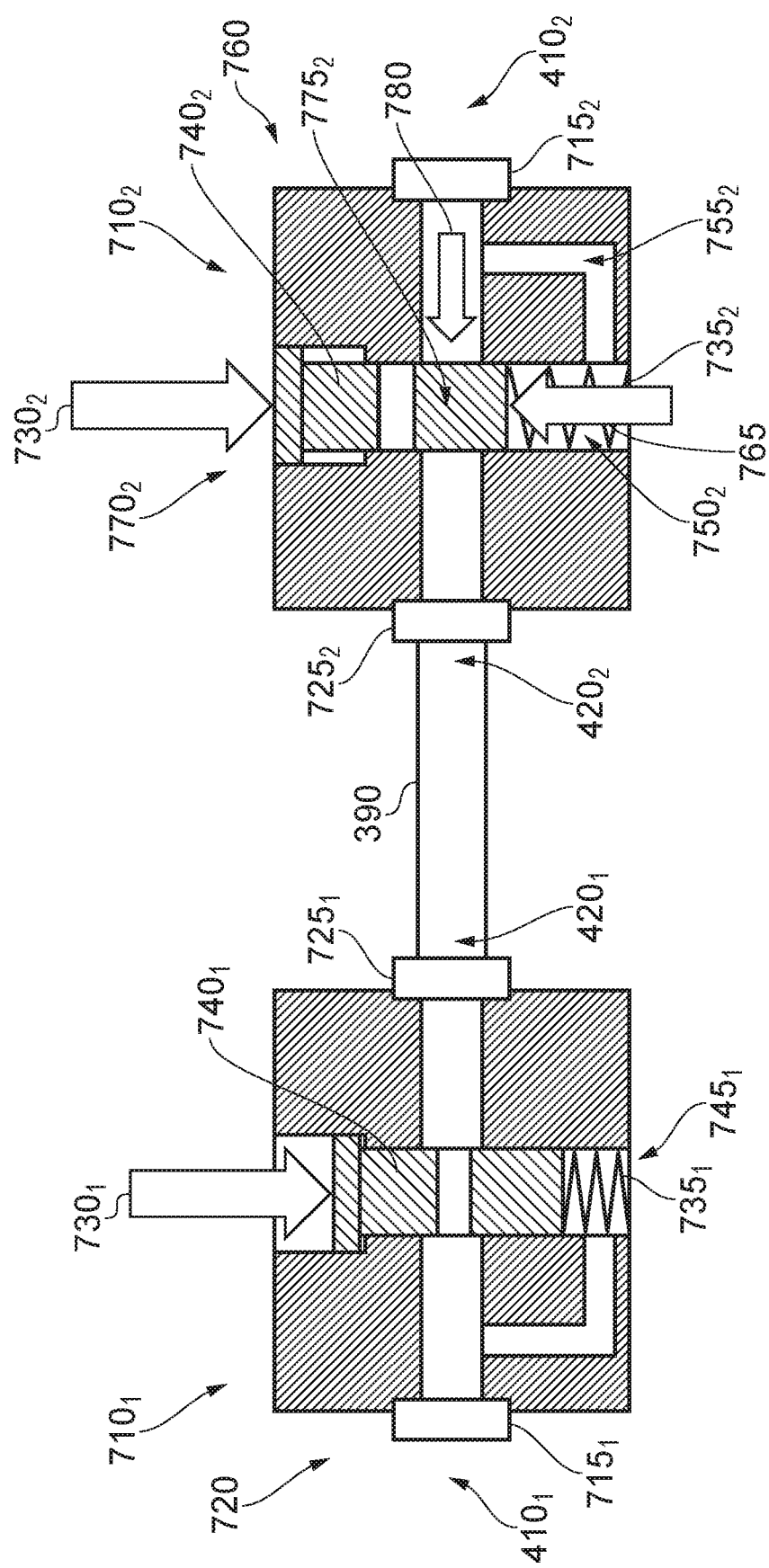
FIG. 7 illustrates two connected alternative isolation valves.

FIG. 7 illustrates alternative first and further isolation valves $710_1$, $710_2$ connected via a connection tube 390. These alternative isolation valves $710_1$, $710_2$ function in much the same way as the isolation valve 380 described in FIGS. 5 and 6. The first and further isolation valves $710_1$, $710_2$ each selectively connect a respective first fluid communication region $410_1$, $410_2$ to a further fluid communication region $420_1$, $420_2$. It will be understood that the first isolation valve $710_1$ shown in FIG. 7 is supported on a first end fitting $300_1$ and the further isolation valve is supported on a further end fitting $300_2$ as illustrated in FIG. 3. Aptly the connection tube 390 may pass through the connection flanges $310_1$, $310_2$ as illustrated in FIG. 3. Aptly the connection tube 390 may pass externally to the connector flanges $310_1$, $310_2$. Aptly the connection tube 390 may be located externally to the end fittings $300_1$, $300_2$. It will be understood that a first port $715_1$ of the first isolation valve $710_1$ is fluidly connected to an annulus of a first segment of flexible pipe body $100_1$ and that a first port $715_2$ of the further isolation valve $710_2$ shown in FIG. 7 is fluidly connected to an annulus of a further segment of flexible pipe body $100_2$ as is illustrated in FIGS. 3 and 4. FIG. 7 illustrates a situation in which the annulus of the further segment of flexible pipe body $100_2$ is flooded with seawater. It should be noted that in FIG. 7 the annulus of the first segment of flexible pipe body $100_1$ is not flooded.

The first isolation valve $710_1$ is disposed in its further mode of operation 720 so as to permit fluid communication between its first port $715_1$ and a further port $725_1$, the further port $725_1$ being fluidly connected to the connection tube 390. The first end fitting $300_1$ and the connection tube 390 are therefore fluidly connected. The arrow labelled $730_1$ illustrates a local environmental pressure provided by seawater of a particular depth at which the first isolation valve $710_1$ is located which is sufficient to compress a spring $735_1$ in the first isolation valve $710_1$ and axially move a slidable member $740_1$ towards a closed channel end $745_1$ of a channel of the first isolation valve $710_1$.

The ingress of seawater into the first port $715_2$ of the further isolation valve $710_2$ from the flooded annulus of the further segment of flexible pipe body $100_2$, and the subsequent ingress of water into a channel $750_2$ of the further isolation valve $710_2$ via a flood passage $755_2$ of the further isolation valve $710_2$ results in the further isolation valve $710_2$ being disposed in its first mode of operation 760 in much the same way as the isolation valve 380 illustrated in FIGS. 5 and 6 as described above. The arrow labelled $730_2$ illustrates a local environmental pressure provided by seawater of a particular depth at which the further isolation valve $710_2$ is located. Here the local environmental pressure is substantially the same as a fluid pressure provided by the seawater in the channel $750_2$ illustrated by the arrow labelled 765 and the spring $735_2$ therefore axially moves the slidable member $740_2$ towards an open channel end $770_2$ of the further isolation valve $710_2$. A slidable body $775_2$ of the slidable member $740_2$ of the further isolation valve $710_2$ is thus disposed to fluidly disconnect the first port $715_2$ and a further port $725_2$ of the further isolation valve $710_2$, the further port $725_2$ of the further isolation valve $710_2$ being fluidly connected to the connection tube 390. The further end fitting $300_2$ and the connection tube 390 are therefore fluidly disconnected and the flooded annulus of the further segment of flexible pipe body $100_2$ is isolated from the annulus of the first segment of flexible pipe body $100_1$ which is not flooded. A pressure of seawater incident on the slidable body $775_2$ of the further isolation valve $710_2$ from the flooded annulus of the further segment of flexible pipe body $100_2$ is also illustrated as the arrow labelled 780. It will be understood that the isolation valve 380 described in FIGS. 5 and 6, or any other suitable isolation valve, can be utilised in the arrangement illustrated in FIG. 7.

Figure 8:
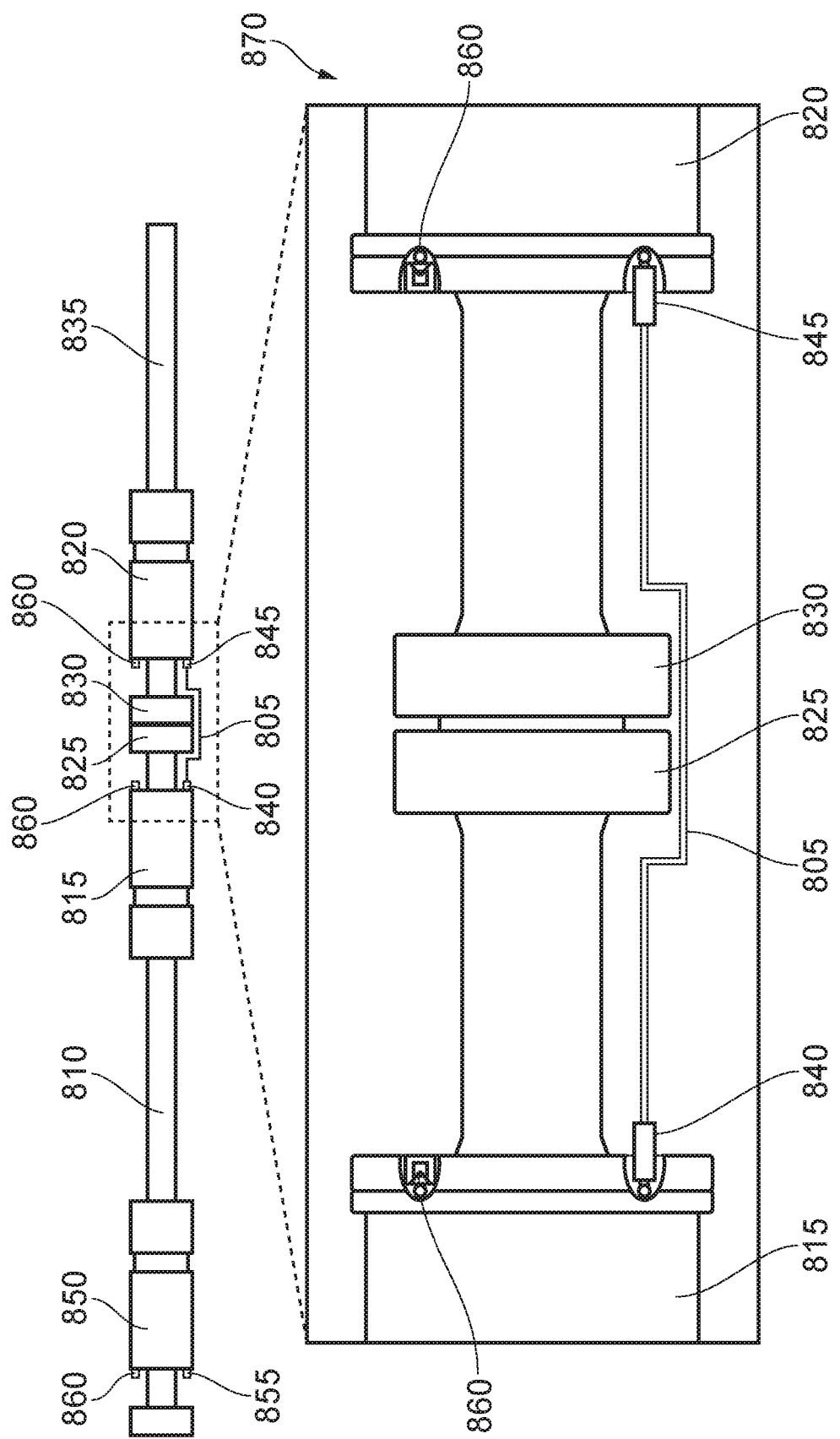
FIG. 8 illustrates an alternative arrangement of a connection tube.

FIG. 8 illustrates an alternative arrangement of a connection tube 805 arranged between two end fittings within a flexible pipe. It will be understood that the segments of flexible pipe body and the respective end fittings in FIG. 8 are of a similar type/configuration to those illustrated in FIGS. 1 to 4. A respective end of a first segment of flexible pipe body 810 is terminated within a first end fitting 815. The first end fitting is secured to a further end fitting 820 via the connector flanges of the first end fitting and the further end fitting by bolting or other securing mechanism. A further segment of flexible pipe body 835 is terminated within the further end fitting 820. In contrast to the arrangement shown in FIGS. 3 and 4, the connection tube 805 does not pass through the connector flanges 825, 830 of the first and further end fittings 815, 820 and instead extends around each connector flange and remains located externally to the end fittings 815, 820. A respective end of the connection tube 805 is terminated by a first isolation valve 840 which is supported on the first end fitting 815 and a further end of the connection tube 805 is terminated by a further isolation valve 845 which is supported on the further end fitting 820. The isolation valves 840, 845 supported on the end first which may be of the type illustrated in FIGS. 5, 6 and 7. The first and further isolation valves 840, 845 therefore each provide apparatus for selective connection of a first fluid communication region located within the first and further end fittings 815, 820 respectively and a further fluid communication region located within the connection tube 390.

The first and further isolation valves 840, 845 are in fluid communication with the annulus of the first and further segments of flexible pipe body 810, 835 via the same or a similar mechanism as illustrated in FIGS. 3 and 4 and therefore act to selectively connect the annulus of the first segment of flexible pipe body 810 to an annulus of the further segment of flexible pipe body 835. It will be understood that the first and further isolation valves 840, 845 also function to fluidly isolate a segment of flexible pipe body with a flooded annulus from neighbouring segments of flexible pipe body by the same or similar mechanism as that illustrated in FIGS. 5 to 7.

A remaining end of the first segment of flexible pipe body 810 is terminated in a still further end fitting 850 and a still further isolation valve 855 is supported on the still further end fitting 850. It will be understood that a respective end of a not shown connection tube can be connected to the still further isolation valve 855 and a not shown isolation valve can be connected to a remaining end of this not shown connection tube. Aptly a not shown end fitting can be secured to the still further end fitting 850. Aptly a not shown end fitting can be secured to a remaining free end of the further segment of flexible pipe body 835.

In the arrangement shown in FIG. 8, each end fitting includes at least one check valve 860 which is in fluid communication with the respective end fitting and with the annulus of a segment of flexible pipe body that is terminated within the respective end fitting. The box 870 illustrates an enlargement of the enclosed dotted area and illustrates the connection between the first and further end fittings 815, 820 including the connection tube 805. This enlargement 870 clearly illustrates that the connection tube 805 extends around the connector flanges 825, 830 of the first and further end fittings 815, 820 instead of passing through them. The flanges 825, 830 are connected and secured together in a known manner, for instance using studs and nuts (not shown).

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of selectively connecting a first fluid communication region to a further fluid communication region at a subsea location, comprising:
   biasing a slidable member including a slidable body located, and axially slidable, in a channel within a valve body towards an open channel end of the channel via at least one biasing element disposed at a closed channel end of the channel whereby a slidable member fluid passage extending across the body of the slidable member is non-aligned with a primary passageway extending through the valve body and intersecting the channel, the primary passageway extending from a first port of the valve body connected to a first fluid communication region to a further port of the valve body connected to a further fluid communication region, the slidable body being biased to disconnect fluid communication between the first fluid communication region and the further fluid communication region;
   providing a local environmental pressure proximate to the open channel end;
   when the local environmental pressure increases beyond a threshold pressure, urging the slidable member towards the closed channel end whereby the slidable member fluid passage and the primary passageway are at least partially aligned thereby fluidly connecting the first fluid communication region and the further fluid communication region;
   providing a fluidic pressure within a portion of the channel between the closed channel end and the primary passageway, said portion of the channel being connected to a portion of the primary passageway between the first port and the channel via a flood passage wherein the fluidic pressure is provided by a fluid; and limiting a maximum displacement of the slidable member towards the closed channel end via an abutment seat on an inner surface of the channel which abuts against an outwardly extended region of the slidable member, said maximum displacement of the slidable member providing at least partial alignment of the through passage and the primary passageway.

2. The method as claimed in claim 1, further comprising:
when the fluidic pressure is greater or less than a predetermined threshold, via the fluidic pressure together with the biasing element, urging the slidable member towards the open channel end thereby disconnecting fluid communication between the first fluid communication region and the further fluid communication region.

3. The method as claimed in claim 1, wherein
the fluidic pressure and the local environmental pressure are substantially the same and optionally are provided by seawater.

4. The method as claimed in claim 1, further comprising:
at least partially sealing the valve body from the external environment via at least one sealing element on the slidable member and/or an inner surface of the channel.

5. The method as claimed in claim 1, further comprising:
limiting a maximum displacement of the slidable member towards the open channel end via an abutment collar, or cap, which limits the travel of the slidable member and prevents the slidable member from exiting the open channel end.

6. An apparatus for selective connection of a first fluid communication region to a further fluid communication region at a subsea location, comprising:
a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end, wherein the valve body further comprises a flood passage connecting a portion of the primary passageway between the first port and the channel, and a portion of the channel between the closed channel end and the primary passageway;
at least one slidable member comprising a slidable body locatable in the
channel and comprising a slidable member fluid passage extending through or around the slidable body; and
at least one biasing element locatable proximate to at least one of the open channel end or closed channel end, for biasing the slidable body towards the open channel end; wherein
the slidable member is slidable along a longitudinal axis of the channel responsive to a local environmental pressure provided at the open channel end.

7. The apparatus as claimed in claim 6, wherein
in a first mode of operation in which a first biasing force at a position where at least one biasing element is located, and at least partially provided by the at least one biasing element, is greater than a further biasing force provided by the local environmental pressure, the slidable member is urged towards the open channel end such that the primary passageway and the slidable member fluid passage are non-aligned and the body of the slidable member is disposed to disconnect fluid communication between the first fluid communication region and the further fluid communication region.

8. The apparatus as claimed in claim 7, wherein
in a further mode of operation in which the further biasing force is greater than
the first biasing force, the slidable member is locatable such that the slidable member fluid passage and the primary passageway are at least partially aligned and the first fluid communication region and the further fluid communication region are in fluid communication.

9. The apparatus as claimed in claim 6, wherein
a fluid in said a portion of the channel provides a fluid pressure, the fluid pressure providing a fluidic biasing force which contributes to the first biasing force and optionally the fluid pressure is substantially the same as the local environmental pressure to bias the slidable member in the first mode of operation.

10. The apparatus as claimed in claim 6, wherein:
an inner channel surface of the channel comprises an abutment seat that is optionally located within a portion of the inner channel surface between the primary passageway and the open channel end,
and the body of the slidable member comprises an outwardly extended region locatable proximate to the open channel end, the outwardly extending region being wider than an inner surface of the abutment seat.

11. The apparatus as claimed in claim 6, wherein
the at least one biasing element comprises at least one spring.

12. The apparatus as claimed in claim 6, wherein
the slidable member and/or the inner surface of the channel comprises at least one sealing element.

13. The apparatus as claimed in claim 6, wherein
at least the valve body comprises a corrosion resistant material and optionally the slidable member comprises a corrosion resistant material.

14. A flexible pipe, comprising:
a first segment of flexible pipe body;
a first end fitting secured to a respective end of the first segment of flexible pipe body; and
an apparatus for selective connection of a first fluid communication region to a further fluid communication region at a subsea location, comprising:
a valve body that includes a primary passageway extending from a first port of the valve body, and connectable to a first fluid communication region, to a further port of the valve body, connectable to a further fluid communication region, the valve body comprising a channel intersecting the primary passageway and extending between an open channel end and a closed channel end, wherein the valve body is a first valve body supported on the first end fitting such that a first port of the first valve body is connected to the first end fitting and is fluidly connected to an annulus of the first segment of flexible pipe body;
at least one slidable member comprising a slidable body locatable in the channel and comprising a slidable member fluid passage extending through or around the slidable body; and
at least one biasing element locatable proximate to at least one of the open channel end or closed channel end, for biasing the slidable body towards the open channel end,
wherein the slidable member is slidable along a longitudinal axis of the channel responsive to a local environmental pressure provided at the open channel end.

15. The flexible pipe as claimed in claim 14, wherein the further port of the first valve body is fluidly connected to at least one connection tube, the connection tube optionally being locatable externally to the first segment of flexible pipe body and the first end fitting.

16. The flexible pipe as claimed in claim 14, further comprising:
  at least one further segment of flexible pipe body;
  at least one further end fitting secured to a respective end of the further segment of flexible pipe body; and
  a further valve body supported on the further end fitting such that a
  first port of the further valve body is fluidly connected to an annulus of the further segment of flexible pipe body.

17. The flexible pipe as claimed in claim 16, wherein the further end fitting is arranged adjacent to the first end fitting and the connection tube extends from the further port of the first valve body to the further port of the further valve body and provides fluid communication between the further port of the first valve body and the further port of the further valve body, the connection tube optionally being locatable externally from the first end fitting, the further end fitting, the first segment of flexible pipe body and the further segment of flexible pipe body.

* * * * *